March 23, 1971 J. R. SNYDER 3,572,406
LIGHTER CHARGING VALVES
Filed Aug. 5, 1968 2 Sheets-Sheet 2

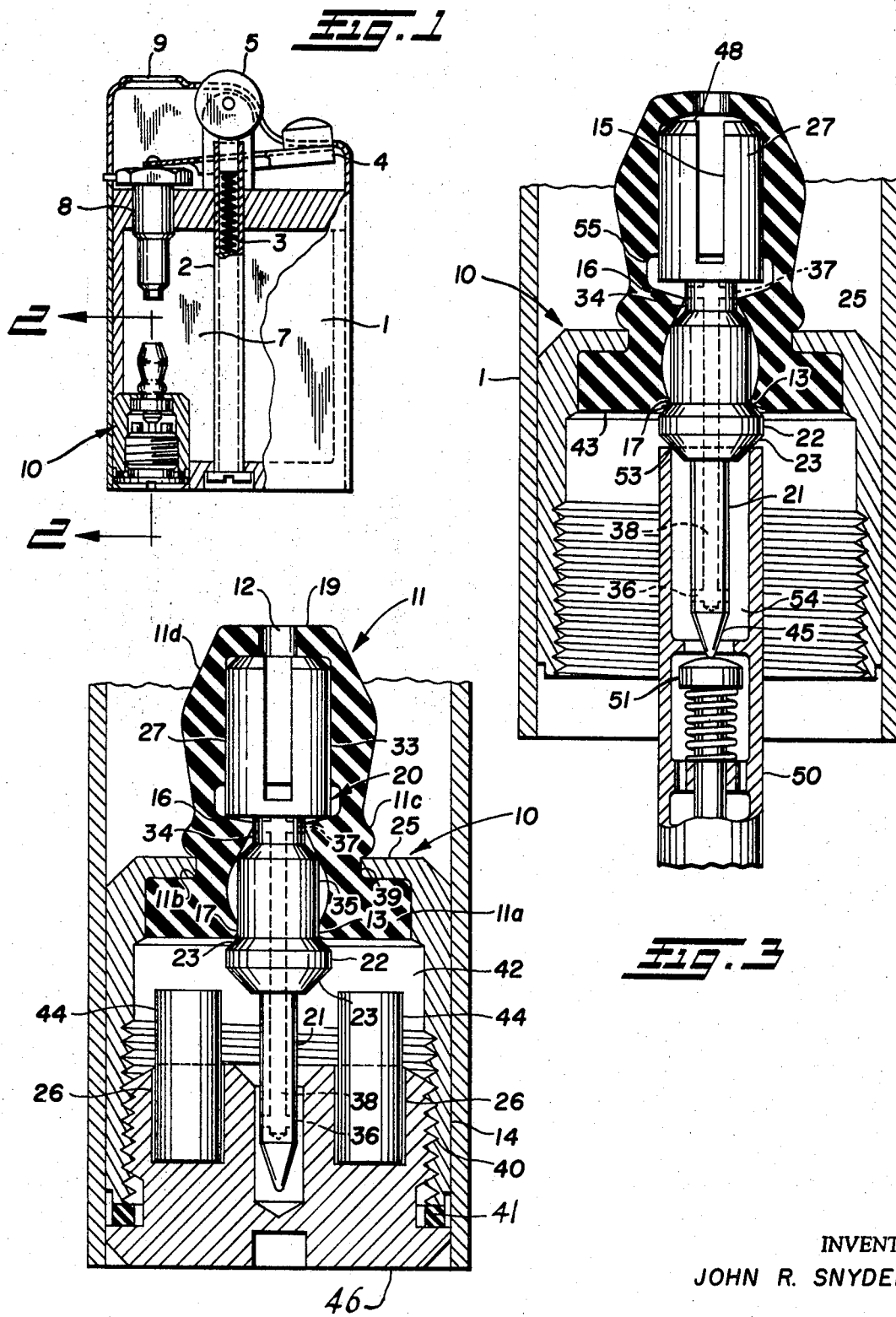

INVENTOR
JOHN R. SNYDER
BY Teagno & Toddy
ATTORNEYS

United States Patent Office 3,572,406
Patented Mar. 23, 1971

3,572,406
LIGHTER CHARGING VALVES
John R. Snyder, Euclid, Ohio, assignor to Eaton Yale &
Towne Inc., Cleveland, Ohio
Filed Aug. 5, 1968, Ser. No. 750,146
Int. Cl. F16k 15/20
U.S. Cl. 141—349        4 Claims

ABSTRACT OF THE DISCLOSURE

A lighter charging valve for regulating the introduction of pressurized gaseous fuel into a gas-type cigarette lighter. A resilient valve body is attached to a bushing, the latter of which being attached to the cigarette lighter case. The resilient valve body has a fluid flow passage extending therethrough. A valve insert assembly is disposed within the resilient valve housing and includes a first and a second valve head for sealing against corresponding first and second valve seats within the resilient valve body. Pressurized gaseous fuel is introduced into the lighter by axially moving the valve insert and the pressurized gaseous fuel through a central bore in the valve insert to an exit between the first and second valve seats. The first valve is unseated from said first valve seat by the axial movement thereby permitting the introduction of the gaseous fuel into the lighter housing; the second valve and valve seat are in sealing engagement precluding the escape of the gaseous fuel to the exterior of the lighter. A storage area within the charging valve is also provided for the retention of replacement flints.

---

This invention relates generally to a normally closed liquified gas fuel charging valve for use with cigarette lighters or the like. Specifically, it relates to a charging or injection valve assembly which is incorporated in a gas fuel cigarette lighter of the type having a chamber for storing compressed gas.

In the known charging valves used for gas fuel cigarette lighters, a plurality of precision components are required to insure effective charging of the cigarette lighter while preventing the escape of pressurized fuel to the atmosphere during the charging operation. Such a lighter charging valve typically includes a metallic housing in which is housed a valve insert assembly. The valve insert assembly will incorporate a plurality of individual seals and a spring which holds the valve insert assembly in a normally closed position. At least one of the seals is required to prevent the escape of pressurized gas from the lighter housing chamber to the atmosphere. Most constructions require at least two seals to effect such a seal relation. A third seal is then required to seal the valve insert assembly in its open position, i.e. the position of the valve insert assembly when the lighter is being charged by pressurized gaseous fuel, in order to prevent escape of fuel from the storage chamber to the atmosphere. The components of such a charging valve assembly are inherently small so that they can be accommodated in a cigarette lighter and therefore have to be of precise construction to effect a proper fit and sealing relationship. These precise small parts are relatively costly to manufacture as well as requiring sophisticated assembly procedures to insure proper operation. A further drawback of prior art charging valves is that the small close-fitting components often have foreign matter introduced into the space between the valve insert and the valve housing, thereby causing a sticking of the valve resulting in improper operation or leakage of gas.

The invention of the present case solves the problems of the prior art valves and further provides a valve assembly which is substantially more economical to manufacture, easier to assemble, has superior operating characteristics and has smaller physical dimensions than previously known lighter charging valves.

The lighter charging valve according to the present invention includes a bushing to which is attached a resilient valve body containing a valve insert for regulating the introduction of gaseous fuel into a lighter and for preventing the escape of fuel during and after charging. One embodiment of the charging valve includes a cylindrical cup-shaped bushing attached to the base of a lighter housing. A resilient valve body is inserted into the bushing with the resilient material of the valve body effecting a seal between the valve body and the bushing. A fluid passageway extends axially through the valve body. A valve insert for regulating fluid flow through the valve body is disposed within the passageway. The resilience of the material comprising the valve body effects a seal between a first valve head portion of the valve insert assembly thereby defining a normally closed valve. A second valve head is incorporated on the valve insert assembly which also is normally seated in sealing relation with a second valve seat of the valve body. The valve insert and valve body in combination provide a normally closed valve assembly which prevents leakage of the liquified gas contained within storage chamber of the lighter and the atmosphere. An inlet port normally open to the atmosphere extends through the valve insert assembly and has an outlet port exiting at a point located between the first and second valve seat of the valve body. To introduce fuel into the lighter storage chamber a container of liquified gas is coupled to the valve insert in a conventional manner. Movement of the container and valve insert to unseat the first valve head from the valve body provides a direct fluid passageway from the fluid gas container into the storage chamber. Thus, the pressurized gas first passes through the passageway in the valve insert assembly, exits from the outlet port and passes through the cavity between the first valve seat and first valve head and is directed into the liquified gas storage chamber within the lighter. The second valve head and valve seat remain in sealed contact during the charging operation, thus precluding the escape of pressurized fuel to the atmosphere.

The biasing of the valve insert assembly to a sealed relationship with the valve body is effected by the resilience of the valve body and the sealing between the valve body and the valve insert assembly both in the normally closed position and in the open position is achieved by the coaction between the resilient valve body and the valve insert assembly.

It is, therefore, a primary object of this invention to provide a normally closed liquified gas charging valve for cigarette lighters that has a relatively few number of parts, is reliable in operation and which insures proper control of gas flow during the charging process for cigarette lighters.

Another object of the instant invention is to provide an effective valve for pressurized gaseous fuel lighters which prevents the escape of the fuel during the charging operation.

A still further object of this invention is to provide a valve insert assembly which enhances the flow rate of gas between the valve insert assembly and the valve body during the fuel charging operation.

A further object of this invention is to provide a valve body which serves as both a sealing element and a biasing element cooperating with the valve insert assembly.

These and other features of the invention will be apparent from the following description of several embodiments of the invention illustrated in the drawings, in which:

FIG. 1 is a section view of a conventional butane lighter embodying a charging valve according to the instant invention;

FIG. 2 is a cross-sectional view of one embodiment of a charging valve according to the invention;

FIG. 3 is a cross-sectional view of the embodiment of FIG. 2 in the charging position;

Figure 4:
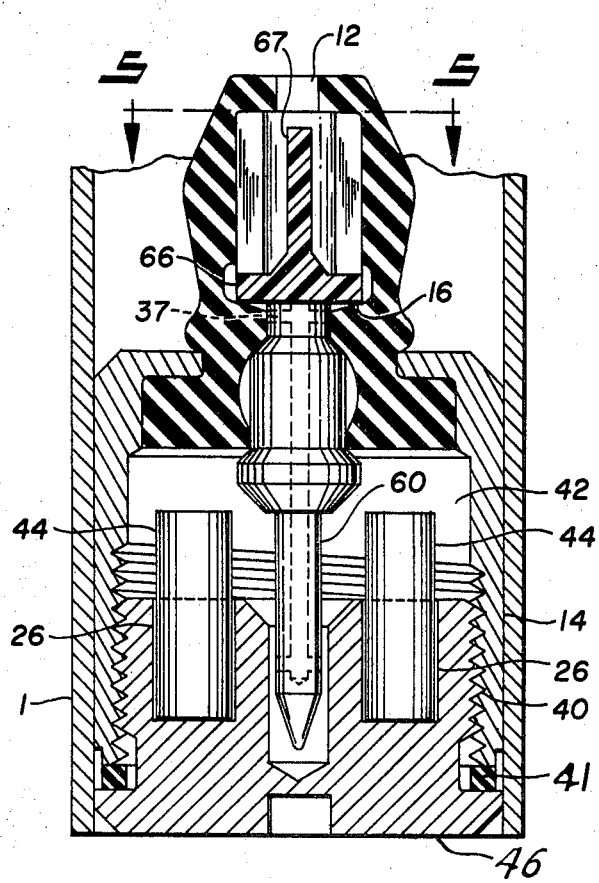
FIG. 4 is an alternative embodiment of a charging valve according to the invention.

Referring to FIG. 1 there is shown a conventional pressurized gaseous fuel cigarette lighter comprising a lighter case 1 having a fuel storage chamber 7 therein, a burner valve 8 for regulating the discharge of fuel from the chamber 7 during ignition, a charging valve 10 for introducing pressurized fuel into the chamber 7, a flint wheel 5, a flint cylinder 2 and a plunger lever 4. The pressing of the plunger lever 4 coincident with the rotation of flint wheel 5 causes a spark to be initiated which will ignite the fuel emanating from the burner valve 8. After ignition of the valve, the resulting flame extends through orifice 9. At the base of the lighter case 1 is fastened the charging valve 10. The charging valve permits the introduction of pressurized fuel, preferably butane, into the storage chamber 7 from an external source, for example a conventional pressurized container of butane fuel.

FIG. 2 shows an enlarged cross-sectional view of the charging valve depicted in FIG. 1. The housing for the charging valve is defined by a chamber bushing 14. The chamber bushing of the present embodiment is of metal construction and is adapted to be either soldered or bonded to the lighter case 1. The chamber bushing 14 is substantially cylindrical in shape and has a threaded bore 40 at the outer end thereof and internal annular shoulder 25 which defines an opening 39 therethrough at the inwardly disposed end. Attached to the chamber bushing 14 is a valve body 11 of resilient material, preferably a nitral rubber. A flange 11a on the valve body is disposed within the cavity defined by the cylindrical wall of the chamber bushing 14 and the internal annular shoulder 25. Annular surface 11b engages the internal diametral surface of the shoulder 25 and a lip 11c abuts the endface of the annular shoulder 25 to provide an interlocking engagement between the shoulder 25 and the valve body 11. A nipple portion 11d extends into the interior of the storage chamber 7. An internally disposed flange 19 having an orifice 12 therethrough defines the nipple endface. The shoulder engaging annular surface 11b is of greater diameter than the internal diametral surface of the shoulder 25 which it engages, thereby insuring an interference fit and a positive seal at the point of interconnection.

The valve body 11 includes an axially extending passageway of irregular configuration therethrough. A valve insert assembly 20 is disposed within this passageway to regulate the flow of pressurized fuel into the fuel storage chamber 7 and to prevent the escape of the pressurized fuel therefrom.

The valve insert assembly 20 includes a first valve head 27 of substantially cylindrical cross-section, having a transverse slot 15 extending substantially the total axial extent thereof. Adjacent to the valve head 27 is a neck section 34 of substantially lesser diameter than the valve head 27. Coupled to the neck section is a secondary valve head 35. A flange 22 is coupled to the secondary valve head and includes chamfered shoulders 23 on either side thereof. A pin 21 is attached to the flange 22.

Also shown in FIG. 2 is the configuration of the fluid passageway of valve body 11. The outlet orifice 12 is located centrally of the internal flange 19 on the end of the nipple lid of the valve body. Inwardly of this orifice is located a substantially cylindrical cavity 33 in which the valve head 27 is disposed. The axial extent and the diameter of this cavity is of lesser dimension than the corresponding dimensions of the valve head and, therefore, positively engages the outer surface of the valve head 27.

An inclined internal shoulder located at the end of the cylindrical cavity remote from the orifice 12 provides a first valve heat 16. Adjacent the valve seat, and extending into the cylindrical cavity, is an enlarged diametral cavity 55 which both directs the flow of fuel after the valve head 55 has been unseated from the valve seat 16 and defines an area of the valve body having a reduced cross-section and increased resilience adjacent the valve seat 16. A pear-shaped bore is located adjacent the first valve seat and houses the secondary valve head 35. A second valve seat 17 for engaging the second valve head 35 is located adjacent the orifice 13 at the flange end 11a of the valve body. The second valve seat 17 is defined by a cylindrical bore of lesser diameter than the outside diameter of the second valve head 35. The valve seat in the normal position depicted in FIG. 2 positively engages the secondary valve head 35 to provide a fluid seal.

An inlet port 36 is shown traversing the pin 21. This inlet port intersects a central bore 38 which extends into the neck section 34 and terminates at an outlet port 37. The outlet port is interposed the first valve seat 16 and the second valve seat 17.

A threaded dust cap 46 is screwed into the chamber bushing. An optional gasket 41 is located between the dust cap 46 and the chamber bushing 14 prevent the introduction of any foreign matter into the charging valve chamber and also to preclude the escape of any fuel leakage from the butane storage chamber 7 via the charging valve assembly. A plurality of cavities 26 are provided within the endface of the dust cap to provide a storage chamber for replacement flints 44.

FIG. 3 illustrates the charging valve of FIG. 2 in the open position which occurs when the lighter is being charged with fuel. To charge the lighter, a user first removes the dust cap 46 and then inserts a butane container nozzle 50 into the chamber bushing 14 such that the container nozzle 50 surrounds the pin 21. The endface of the nozzle abuts the outward shoulder 23 of the flange 22. The user then exerts a slight pressure on the valve insert assembly with the nozzle. By pushing the fuel container nozzle against the flange 22 the valve insert assembly will extend to the valve body 11 thereby unseating the valve head 27 from the first valve seat 16. Coincident with the unseating of the valve head 27 from the valve seat 16 is the compression of the second valve seat 17 by the inner chamfered shoulder 23 of the flange 22. The compression of the valve seat 17 forces the resilient material comprising the second valve seat against the second valving head thereby effecting a positive seal therebetween.

The charging of the lighter with pressurized fuel from the container (not shown) will now be described. Release of the pressurized fuel from the fuel container is coincident with the application of a force by the user against the valve insert assembly 20. The pin 21 depresses a valve 51 located internally of the container nozzle to an open position, thus releasing fuel into the volume 54 defined by the interior surface of the nozzle 50 and the exterior surface of the pin 21. The nozzle endface 53 substantially sealingly abuts the chamfered shoulder 47 of the flange 22, confining the fuel to the volume 54. The pressurized fuel thus enters the inlet port 36 in the pin 21 and traverses the central bore 38 to exit from the outlet port 37 in the region surrounding the neck section 34. The pressurized fuel then flows through the space between the valve head 27 and the first valve seat 16 into the enlarged cavity 55. The wall section, surrounding cavity 55, directs the pressurized butane into the slot 15 in the valve head wherein it is directed to the outlet orifice 12 and into the butane storage chamber 7. It should be noted that the second valve seat contacting the secondary valve 17 prevents the escape of pressurized butane from the interior of the valve body 11 into the cavity of the chamber bushing 14 and, hence, to the atmosphere.

After the lighter has been charged sufficiently with a new supply of butane, the butane nozzle is withdrawn from the valve insert assembly 20. Coincident with the withdrawal of the nozzle 50 from the valve insert assembly 20 is the seating of the valve head 27 against the first valve 16 thus sealing the fuel storage chamber from the atmosphere. The reseating of the valve head 27 against the valve seat 16 is accomplished by the resilience of valve body 11 which normally biases the valve head 27 against the first valve seat 16.

After the butane charging container has been removed, the dust cap 46 is again screwed into the chamber bushing. The gasket 41 interposed the dust cap and the bushing precludes the introduction of foreign material into the bushing cavity 42 or an inadvertent unseating of the valve insert body.

Figure 5:
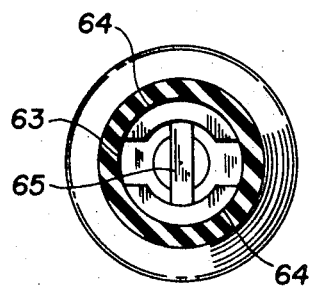
FIG. 5 is a sectional view illustrating the valve head of FIG. 4.

FIG. 4 illustrates an alternative embodiment of a valve insert assembly 60 for the charging valve according to the instant invention. In referring to this figure, like reference characters will be used to designate the corresponding parts as previously illustrated in FIGS. 1-3. The valve insert of FIG. 4 is particularly adapted for regulating the flow of a gaseous fuel. The only difference between the valve insert assembly 20 FIGS. 2 and 3 and the valve insert assembly 60 FIG. 4 lies in the configuration of the valve head 67. The base portion of the valve head which engages the valve seat 16 is of cylindrical construction and is identical to the base portion of the valve head 27. The valve head is further comprised of a pair of cylindrical side wall sections 64 which are disposed within the cylindrical valve body cavity. A groove 63 separates the two side wall sections 64. A rib 65 supports the two side wall sections in the diametrically opposed relation illustrated in FIG. 5. The groove 63 and the internal cavity adjacent to the side walls section 64 and rib 65 provide a non-restrictive flow path for the pressurized fuel. The fuel will exit from the outlet port 37, proceed beyond the first valve seat 16, around and into the enlarged cavity surrounding the valve head base 66 and immediately into the groove 63 and adjacent cavity 62. The pressurized butane then flows into the fuel storage chamber 7 within the lighter via the orifice 12. The valve insert assembly 60 is fabricated out of a synthetic material, preferably Delrin.

With this description, it is believed obvious that the advantages enumerated are obtained, and while I have illustrated and described the preferred forms of construction of my invention, I do not wish to limit myself to the precise details of the structure shown, but desire to avail myself of such variations and modifications as may come within the scope of the appended claims.

I claim:

1. A lighter charging valve comprising:
    a housing means;
    a resilient valve body coupled to said housing means and having a passageway therethrough providing an inlet and an outlet orifice at the distal ends thereof, said resilient valve body including a first and second valve seat disposed in said passageway interposed said inlet and outlet orifices;
    valve insert means movably disposed within said passageway, said valve insert means comprising a first generally cylindrical valve head normally abutting said first valve seat in sealing engagement therewith,
    a stem mounted adjacent said first valve head and including a second valve head normally abutting said second valve seat in sealing engagement therewith,
    said stem having a bore extending axially therein and including an inlet port for receiving fuel and an outlet port, said output port being interposed said first and second valve seats; both said inlet port and said outlet port being intersected by said bore,
    said first valve seat being defined by an internal shoulder extending to said passageway of said valve body at an angle relative to a longitudinal axis thereof, said first valve head being disposed within a portion of said passageway between said first valve seat and the outlet orifice, and having a greater axial dimension than the corresponding relaxed dimension of said portion of said passageway thereby flexing said resilient valve body, said flexure of said valve body biasing said first valve head into sealing contact with said first valve seat,
    said first valve head having an axial slot therein confronting the outlet orifice in said valve body; and
    the internal wall of said valve body defining an enlarged diametral cavity adjacent said first valve seat and surrounding said first valve head, whereby an uninterrupted flow path is provided through said valve from said outlet port, through the gap between said valve head and said valve seat into said enlarged diametral cavity and said axial slot in said valve head and terminating at said outlet when said first valve head is displaced from said first valve seat.

2. A lighter charging valve according to claim 1 further comprising a dust cap sealingly engaging said housing, said dust cap having an end face in space relationship from said bushing, wherein said end face includes a plurality of cavities therein for the storage of replacement flints.

3. A valve comprising:
    housing means;
    a resilient valve body coupled to said housing having a passageway therethrough, thereby defining orifices at the distal ends thereof, one of said orifices being an outlet orifice, said resilient valve body including a first and second valve seat in said passageway interposed the orifices, said first valve seat being inclined at an angle relative to a longitudinal axis of said valve body,
    a valve insert means disposed within said valve body, said valve insert means comprising a cylindrical head portion and a generally cylindrical body portion, said cylindrical head portion normally engaging said inclined valve seat for sealing engagement therewith, and said generally cylindrical body portion cooperating with said resilient valve body to define a portion of a flow path between said valve seat and said outlet orifice,
    the portion of said resilient valve body radially adjacent said insert body portion being of relatively thick cross section for radially embracing said insert body portion throughout a major portion of axial length thereof and for cooperating with said inclined valve seat to insure sealing engagement between said valve seat and said cylindrical head portion, and
    an elongated member adjacent to said valve insert and extending exteriorly of said valve body, said elongated member including a portion normally engaging the second valve seat for sealing engagement therewith, said member having a bore extending axially thereof including an inlet port and an outlet port, said outlet port being interposed said first and second valve seats, whereby a continuous flow path is defined between said inlet port and said valve body outlet orifice in response to unseating of said valve head from said first valve seat.

4. The valve of claim 3 wherein the improvement further comprises:
    said resilient valve body having cylindrical chamber larger in diameter than said valve insert means adjacent said valve seat to provide a most resilient portion of reduced cross section in said valve body whereat substantially all distention of said valve body occurs when said valve member is moved to open a flow path through said valve, said cylindrical chamber forming an annular clearance with said valve head to provide a portion of the flow path through said valve, and
    said valve insert means comprises a pair of diametrally opposed grooves for providing the portion of the flow path between said annular clearance and said outlet orifices.

References Cited

UNITED STATES PATENTS

| | | | |
|---|---|---|---|
| 3,107,683 | 10/1963 | Ochoa | 137—223 |
| 3,283,963 | 11/1966 | Boyer et al. | 251—353X |
| 3,415,426 | 12/1968 | Kleveland | 222—402.24X |
| 3,422,837 | 1/1969 | Boyer et al. | 137—223X |

FOREIGN PATENTS 1,115,926  6/1968  Great Britain  137—525

OTHER REFERENCES

Modern Beauty Shop, November 1969, page 48.

SAMUEL B. ROTHBERG, Primary Examiner

U.S. Cl. X.R.

141—379; 251—353